ized Dec. 19, 1967

United States Patent Office 3,359,129
Patented Dec. 19, 1967

3,359,129
METHOD OF PHOTOPOLYMERIZING ACRYLIC MONOMER COATINGS
Tzu Jen Mao, Royal Oak, Mich., assignor to General Motors Corporation, Detroit, Mich., a corporation of Delaware
No Drawing. Filed May 15, 1964, Ser. No. 367,858
6 Claims. (Cl. 117—34)

ABSTRACT OF THE DISCLOSURE

This invention relates to a process for forming a smooth, hard, adherent, acrylic resin coating on an article. A thin layer of a composition containing a photo initiator and either glycidyl methacrylate or 2-methoxyethyl methacrylate is applied to a substrate. This layer or coating is subjected to ultraviolet radiation at room temperature until the monomeric coating is cured.

---

This invention relates to the photochemical polymerization and more particularly to the photochemical polymerization of acrylic monomers to form a coating on a substrate under atmospheric pressure conditions.

It is known that acrylic monomers may be polymerized by thermal polymerization or by photochemical polymerization. Thermal polymerization is the conventional method for polymerizing acrylic monomers where temperatures in the neighborhood of 80° C. may be tolerated. If it is desirable or necessary to conduct the polymerization of acrylic monomers at temperatures significantly lower than 80° C., as for example at room temperature, then one method that can be used is photochemical polymerization. A basic advantage of photochemical polymerization is that no heat is applied to the system and the polymerization can be carried out at the much lower temperature. In the past, acrylic films have been prepared by photopolymerization by processes involving initially either relatively viscous polymers in solvent solution or relatively volatile monomers reacted under super-imposed pressure conditions. These processes have inherent disadvantages for use in coating or painting articles such as automobile bodies or appliances on a production line basis in that the former involves a solvent which must be removed in the curing process and which the latter requires a super-imposed pressure to prevent evaporation of the acrylic monomers.

It is an object of this invention to provide a coating process whereby a liquid comprising an acrylic monomer and including a photo-initiator is applied to a substrate under atmospheric pressure at room temperature and is polymerized by ultraviolet radiation to provide at atmospheric pressure and room temperatures and without solvent removal a smooth, adherent, solvent resistant, heat resistant, rigid, acrylic resin coating. It is a further object of this invention to provide a process in which no solvent is needed as a vehicle to transfer the acrylic coating material to the substrate. Another object is to provide a process in which no solvent evaporation step is necessary. It is yet another object to provide a process in which no heat is needed to cure the coating. It is a further object to provide a composition of an acrylic resin which has superior endurance, toughness and adhesive characteristics.

These and other objects are accomplished by preferably spraying an acrylic monomer having high reactivity and low volatility in the form of glycidyl methacrylate or 2-methoxyethyl methacrylate containing a small but effective amount of a photo-initiator such as benzoyl peroxide onto the substrate and then subjecting the monomer to ultraviolet radiation until the coating is cured. In a preferred embodiment of the invention, minor amounts of an acrylic polymer are dissolved in the methacrylate monomer.

Further objects and advantages of the present invention will be apparent from the following detailed description, reference being had to the following examples wherein the preferred embodiments of the present invention are clearly shown.

The conventional process of painting automobile bodies in the automotive industry where acrylic paint is used involves a number of steps. A steel panel of an automobile body or the substrate is first conditioned by subjecting it to a cleaning and phosphating treatment. This treatment removes the grease or any impurities which may have contaminated the steel. Phosphating also improves the corrosion resistance of the metal. Next, a suitable primer is applied as for example by spraying a polyester or an epoxy resin containing a suitable amount of pigment thereon. The purpose of the primer is to afford the body better corrosion resistance, a smoother surface and better adhesion. Certain parts of the automobile body such as the hood, may be dipped in a primer in order to give it a better resistance to corrosion. The primed substrate is then baked for 45 minutes at 300°–385° F. Following this curing procedure the primer coating is sanded. The panel is then ready for the high gloss acrylic coating to be applied.

The conventional method of applying the paint or acrylic coating is to spray an acrylic solution which contains 20% approximately polymer, plasticizer, and pigment and 80% of solvents such as acetone, methylethylketone, Cellosolve acetate and others. After the acrylic solution has been sprayed on it is baked at temperatures ranging from 285° to 300° F. for a period of time ranging from 30 to 45 minutes. As is readily apparent, only 20% of the solution contains material which will provide the surface coating on the substrate. Conversely, 80% of the material of the solution is lost.

In the method of the present invention the primed steel panel or substrate is first conditioned in the manner prepared in the conventional process mentioned above. In the next step of the process, an acrylic monomer having high reactivity and low volatility and containing a photo-initiator is preferably sprayed onto the primed steel substrate in a manner similar to spray painting; although it could be applied by brushing it on or by dipping the panel into the solution. The layer of the acrylic monomer on the primed steel substrate is then subjected to ultraviolet light by means of an ultraviolet lamp (Hanovia) with a high pressure, mercury vapor arc tube providing radiation with wavelengths ranging essentially from 1,849 Angstroms to 4,000 Angstroms positioned one to two inches away from the panel. In a matter of minutes a highly satisfactory acrylic coating is formed as will be hereafter fully described. As will be hereinafter fully described, preferably minor proportions of an acrylic polymer are dissolved in the acrylic monomer and the two acrylic materials combine in the photopolymerization to provide a superior coating. One advantage of the process of this invention is that substantially all of the initial coating composition is present in the final coating instead of only about 20% as the conventional process has. Another important advantage is that no solvent is needed and therefore no solvent evaporation step is required. In addition, it has the advantage of being cured in a short time; approximately 10 minutes or less. Another advantage is that no additional heat need be applied since satisfactory cures are obtained at room temperatures.

*Example No. 1*

| | Parts by weight |
|---|---|
| Glycidyl methacrylate | 100 |
| Benzoyl peroxide | 2 |

The solution of these two components was prepared by thoroughly mixing them. The solution was then sprayed onto a primed steel panel. The monomeric material was then subjected to an ultraviolet lamp as above described positioned one to two inches away from the panel. In 30 minutes the acrylic solution had been cured to form a smooth, adherent coating.

*Example No. 2*

| | Parts by weight |
|---|---|
| Glycidyl methacrylate | 500 |
| Poly (methyl methacrylate) | 100 |
| Benzoyl peroxide | 10 |

The solution was prepared by thoroughly mixing the two components and was applied and irradiated the same way as in Example No. 1. A smooth, adherent coating was formed in 10 minutes.

*Example No. 3*

| | Parts by weight |
|---|---|
| Glycidyl methacrylate | 300 |
| Dichlorobenzoyl peroxide | 6 |

The solution was prepared by thoroughly mixing the two components and was applied and irradiated the same way as in Example No. 1. A smooth, adherent coating was formed in 10 minutes.

*Example No. 4*

| | Parts by weight |
|---|---|
| Glycidyl methacryate | 300 |
| 2-ethylhexylacrylate | 100 |
| Poly (methyl methacrylate) | 100 |
| Benzoyl peroxide | 8 |

The solution was prepared by thoroughly mixing the components and was applied and irradiated as in Example No. 1. In 7 minutes a solid, smooth, adherent coating was formed.

*Example No. 5*

| | Parts by weight |
|---|---|
| 2-methoxyethyl methacrylate | 320 |
| Poly (methyl methacrylate) | 80 |
| Dichlorobenzoyl peroxide | 6.5 |

The solution was prepared by thoroughly mixing the components and was applied and irradiated as in Example No. 1. This led to the formation of a smooth, adherent, clear and glossy coating.

In Examples No. 1 and No. 3 two different photo-initiators were used with glycidyl methacrylate; those initiators being benzoyl peroxide and dichlorobenzoyl peroxide. Other photo-initiators which have been found to function in a manner similar to benzoyl peroxide and dichlorobenzoyl peroxide include benzoin, benzophenone, benzil, naphthalene, and α,α'-azodiisobutyronitrile. The concentration range for the photo-initiators in this process is preferably about 0.5 to 2.0 percent by weight. As indicated in Examples No. 2, No. 4 and No. 5, a polymeric component may be present in the acrylic solution with advantageous results. The addition of the polymer assists in the setting up or the firming or the jelling of the acrylic solution on the substrate. The presence of the polymer makes the solution more viscous and as a result, there is less tendency for the monomer layer to sag. The maximum amount of acrylic polymer which may satisfactorily be used is about 30% by weight. Concentrations above this amount tend to be to viscous in order to be effectively sprayed on the substrate. It may be desirable or necessary to include in the preformed polymer portion a small amount ranging from 1 to 5 percent by weight of another preformed polymer such as cellulose acetate butyrate in order to obtain optimum properties in the acrylic resin coating.

In Examples No. 1, No. 2, No. 3 and No. 4, glycidyl methacrylate was the monomer which was the primary component of the acrylic solution. This monomer had a sufficiently low vapor pressure so that volatility would not be a problem in this process. It should be pointed out that many alkylmethacrylate monomers, and particularly the commercial ones which are available, would be unsuited in the subject process due to their excessive volatility or their low reactivity in the curing step which is carried out in the open system. The structure of glycidyl methacrylate is of extreme importance in this process because it has an oxygen atom which enhances the reactivity of the monomer. The oxygen atom which enhances the reactivity of the monomer is in the glycidyl or the ester portion of the molecule and is the epoxy oxygen shown on the following structure:

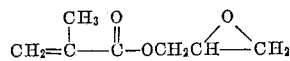

In Example No. 5, 2-methoxyethyl methacrylate is the monomer which also has a sufficiently low vapor pressure to be suitable for this process and it also has an oxygen atom which again enhances the reactivity. The oxygen atom which enhances the reactivity of the monomer is in the 2-methoxyethyl portion or ester portion of the molecule and is the methoxy oxygen which is shown on the following structure:

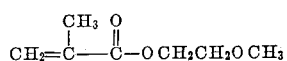

In Example No. 4, in addition to the polymer and glycidyl methacrylate, another acrylic monomer was present; 2-ethylhexyl acrylate. Other acrylic monomers may be used if they have a sufficiently low vapor pressure. The maximum amount of monomer such as this one is about 20%. The amount of this type of monomer which is used depends on its reactivity and the properties desired in the final coating. Several advantages are gained in this process by adding such a monomer such as 2-ethylhexyl acrylate or butyl methacrylate. One advantage is that the process is less expensive because these monomers are cheaper than glycidyl methacrylate or 2-methoxyethyl methacrylate. Another advantage gained by the addition of such monomers is the versatility of the properties that are obtained in the resulting coating.

All paints or surface coatings which are applied to the body of an automobile must pass preliminary screening tests. The acrylic resins and surface coatings which successfully pass the preliminary screening requirements are then evaluated in long term field tests which expose them to the elements for a long period of time. In one test known as the Florida Exposure Test, various panels are coated with the surface coating to be evaluated and then placed on racks and exposed in the open to see how well they stand up under sun, water, and atmospheric conditions. This very severe field test is the final evaporation of the performance of a surface coating. This type of test is a standard test which is used in the automotive industry to evaluate surface coatings. The results of these exposure tests are evaluated by a conventional rating system.

TABLE I.—FLORIDA EXPOSURE TEST RESULTS—RATINGS AFTER 6 MONTHS

[All Coatings Contain 20±5% Preformed Poly (Methyl Methacrylate)]

| Monomer | Color Change | Cracking | Blistering |
| --- | --- | --- | --- |
| Glycidyl methacrylate (Example No. 2). | Slight bleaching | None | Insignificant pinpoint blisters. |
| 2-methoxyethyl methacrylate (Example No. 5). | None | do | None. |
| 2-chloroethoxyethyl acrylate | Medium bleaching | Severe cracking | Dense pinpoint blisters. |
| 2-hydroxypropyl methacrylate | Medium yellowing | Medium cracking | Pronounced flaking in some areas. |

As it was pointed out above, it is necessary to have an acrylic monomer having high reactivity and low volatility in order to obtain the desired coating. Even having high reactivity and low volatility in the acrylic monomer does not insure a suitable coating. The table above showing the Florida Exposure Test results clearly indicates that glycidyl methacrylate and 2-methoxyethyl methacrylate were monomers which, when used in this process, yielded superior surface coatings. There was no cracking; there was either no color change or only a very slight bleaching. In addition, there was either no blistering or only an insignificant amount of pinpoint blisters. The data for two coatings consisting primarily of 2-chloroethoxyethyl acrylate and 2-hydroxypropyl methacrylate, both of which have high reactivity and low volatility for coating formation, indicate serious physical property shortcomings, particularly in their severe cracking, dense pinpoint blisters and pronounced flaking. Neither coating would be considered satisfactory for commercial use.

While the embodiments of the present invention herein disclosed constitute preferred forms, it is to be understood that other forms might be adopted.

What is claimed is as follows:

1. A coating process comprising the steps of providing a coating composition consisting essentially of a methacrylate monomer having high reactivity and low volatility taken from the group consisting of glycidyl methacrylate and 2-methoxyethyl methacrylate and including a photo-initiator, applying a layer of said composition to a substrate under atmospheric pressure, and subjecting said layer to ultraviolet radiation at substantially room temperatures for a time sufficient to cure said layer.

2. The process as set forth in claim 1 wherein said methacrylate is glycidyl methacrylate.

3. A coating process comprising the steps of providing a coating composition consisting essentially of a methacrylate monomer having high reactivity and low volatility taken from the group consisting of glycidyl methacrylate and 2-methoxyethyl methacrylate and including a photo-initiator as well as an acrylic polymer, applying a layer of said composition to a substrate under atmospheric pressure, and subjecting said layer to ultraviolet radiation at substantially room temperatures for a time sufficient to cure said layer.

4. A process as set forth in claim 3 wherein said methacrylate is glycidyl methacrylate.

5. A coating process comprising the steps of providing a coating composition consisting essentially of a methacrylate monomer having high reactivity and low volatility taken from the group consisting of glycidyl methacrylate and 2-methoxyethyl methacrylate, a photo-initiator, an acrylic polymer and including an acrylic monomer having a sufficiently low vapor pressure and moderate reactivity, applying a layer of said composition to a substrate under atmospheric pressure and subjecting said layer to ultraviolet radiation at substantially room temperatures for a time sufficient to cure said layer.

6. The process as set forth in claim 5 wherein said methacrylate having high reactivity and low volatility is glycidyl methacrylate.

References Cited

UNITED STATES PATENTS

| | | | |
| --- | --- | --- | --- |
| 2,413,973 | 1/1947 | Howk et al. | 117—93.3 |
| 2,959,565 | 11/1960 | Stanton et al. | 117—93.31 |
| 2,986,507 | 5/1961 | Steck | 117—93 |
| 2,654,717 | 10/1953 | Rehberg et al. | 117—161 |
| 2,868,760 | 1/1959 | Staicopoulos | 117—132 |
| 2,949,383 | 8/1960 | Blake | 117—72 |

MURRAY KATZ, *Primary Examiner.*